United States Patent
Herloski

(10) Patent No.: US 8,018,630 B2
(45) Date of Patent: Sep. 13, 2011

(54) COMPOUND CURVED CONCENTRATOR BASED ILLUMINATOR

(75) Inventor: Robert Herloski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 228 days.

(21) Appl. No.: 12/408,018

(22) Filed: Mar. 20, 2009

(65) Prior Publication Data
US 2009/0180159 A1    Jul. 16, 2009

Related U.S. Application Data

(62) Division of application No. 11/094,965, filed on Mar. 31, 2005, now Pat. No. 7,593,143.

(51) Int. Cl.
H04N 1/04    (2006.01)

(52) U.S. Cl. ......... 358/475; 358/484; 358/505; 358/474

(58) Field of Classification Search .................. 358/475, 358/484, 505, 474; 362/223, 355
See application file for complete search history.

(56) References Cited

U.S. PATENT DOCUMENTS

| | | | |
|---|---|---|---|
| 3,774,021 A | 11/1973 | Johnson | |
| 4,342,908 A | 8/1982 | Henningsen et al. | |
| 4,939,629 A * | 7/1990 | Glanton et al. | 362/223 |
| 5,153,750 A | 10/1992 | Hiroi et al. | |
| 5,257,340 A | 10/1993 | Kaplan | |
| 5,526,141 A | 6/1996 | Ogura et al. | |
| 5,652,665 A * | 7/1997 | Chen et al. | 358/487 |
| 5,804,818 A | 9/1998 | Kaplan | |
| 5,982,512 A | 11/1999 | Kim | |
| 6,015,200 A | 1/2000 | Ogura | |
| 6,017,130 A | 1/2000 | Saito et al. | |
| 6,046,826 A | 4/2000 | Lu et al. | |
| 6,139,174 A | 10/2000 | Butterworth | |
| 6,186,649 B1 * | 2/2001 | Zou et al. | 362/347 |
| 6,236,470 B1 | 5/2001 | Seachman | |
| 6,268,600 B1 * | 7/2001 | Nakamura et al. | 250/216 |
| 6,299,328 B1 * | 10/2001 | Wilson | 362/223 |
| 6,417,508 B1 | 7/2002 | Ogura et al. | |
| 6,469,808 B1 | 10/2002 | Onishi et al. | |
| 6,476,369 B1 | 11/2002 | Matsumoto | |

(Continued)

FOREIGN PATENT DOCUMENTS

JP    10-274746    10/1998

(Continued)

OTHER PUBLICATIONS

Chinese Office Action with English translation, dated Aug. 1, 2008, in corresponding foreign application 200510127000.9, 12 pp.

(Continued)

Primary Examiner — Houshang Safaipour
(74) Attorney, Agent, or Firm — Pillsburuy Winthrop Shaw Pittman LLP

(57) ABSTRACT

A document illuminator comprising a light-transmissive element having nonlinear walls. The walls are shaped in the form of a compound parabolic concentrator with an optically inverted configuration. A diffusive optical source receives light from a side emitting LED embedded therein and redirects it to an aperture along with other light rays that go through total internal reflection from the nonlinear walls. The reflected light rays that are collected at the aperture are in turn transmitted at high power and uniform luminescence to illuminate a document for scanning.

19 Claims, 3 Drawing Sheets

U.S. PATENT DOCUMENTS

| | | | |
|---|---|---|---|
| 6,563,609 B1 | 5/2003 | Hattori | |
| 6,593,995 B1 | 7/2003 | Hogestyn | |
| 6,598,998 B2 | 7/2003 | West et al. | |
| 6,646,769 B1 * | 11/2003 | Fang | 358/509 |
| 6,661,497 B2 * | 12/2003 | Tabata et al. | 355/69 |
| 6,710,899 B2 | 3/2004 | Chung et al. | |
| 2002/0097578 A1 | 7/2002 | Greiner | |
| 2004/0012943 A1 * | 1/2004 | Toyooka | 362/31 |
| 2005/0093813 A1 | 5/2005 | Yamamoto et al. | |
| 2005/0122742 A1 | 6/2005 | Ho | |
| 2006/0109675 A1 | 5/2006 | Herloski et al. | |
| 2006/0159393 A1 | 7/2006 | Ikeda | |
| 2006/0227393 A1 | 10/2006 | Herloski | |
| 2007/0002567 A1 | 1/2007 | Herloski et al. | |

FOREIGN PATENT DOCUMENTS

| | | |
|---|---|---|
| WO | 9826212 A1 | 6/1998 |

OTHER PUBLICATIONS

Office Action issued in related Chinese application on No. 200510127000.9, Feb. 6, 2009, 12 pages (including full English translation).

Chinese Office Action issued in application No. 200610071001.0, dated Mar. 13, 2009, 11 pages (including full English translation).

* cited by examiner

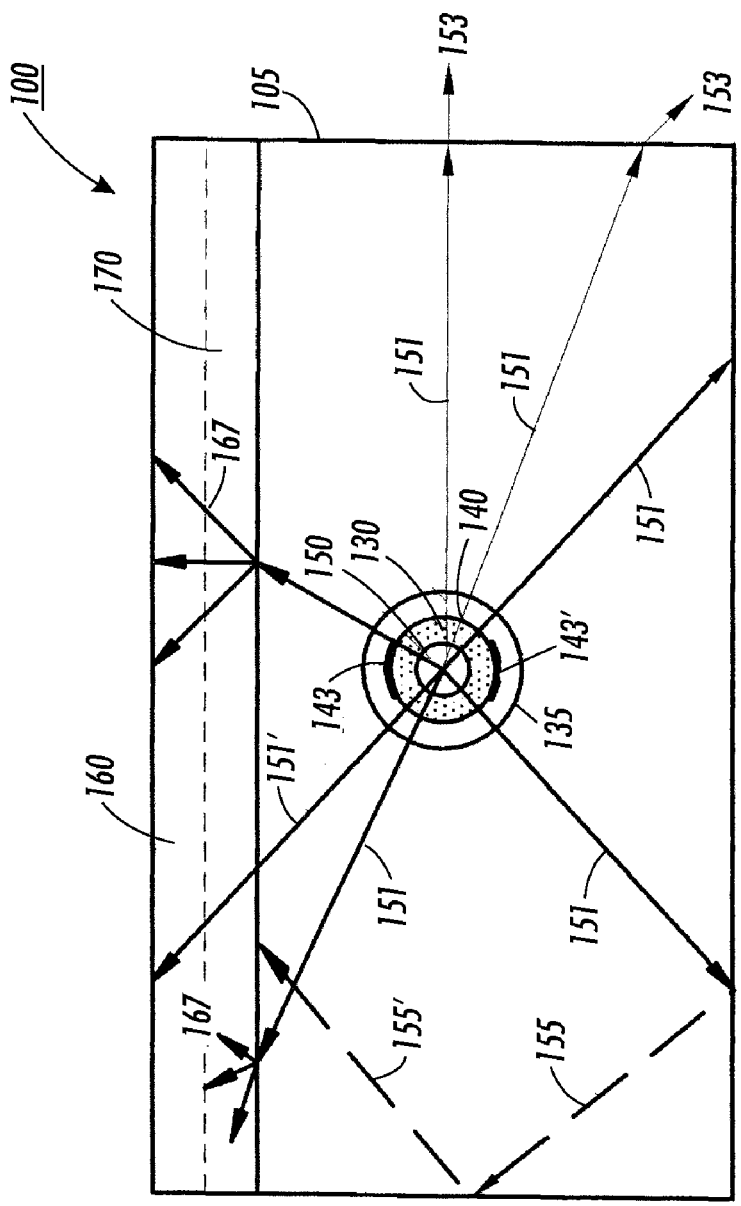
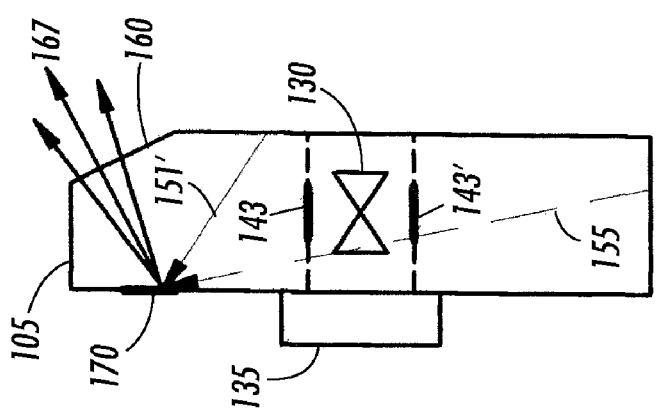
FIG. 2a
FIG. 2b

COMPOUND CURVED CONCENTRATOR BASED ILLUMINATOR

CROSS REFERENCE TO RELATED APPLICATION

This application is a division of, and claims the benefit of priority to, U.S. patent application Ser. No. 11/094,965, filed Mar. 31, 2005, the entire contents of which is incorporated herein by reference.

BACKGROUND

All references cited in this specification, and their references, are incorporated by reference herein where appropriate for teachings of additional or alternative details, features and/or technical background.

Disclosed in the embodiments herein is a document illuminator comprising a light-transmissive element having a compound curved concentrator profile, such as a compound parabolic concentrator profile.

Document illuminators are generally used in systems for scanning documents. The illumination source typically includes a tungsten lamp or fluorescent lamp and an opposing reflector as described in U.S. Pat. No. 6,236,470 which is incorporated in its entirety by reference herein. Although such illumination systems may be adequate for general use, they are spacious and costly to maintain.

An improved illumination source is provided in a related application, U.S. patent application Ser. No 10/995,462 filed on 23 Nov. 2004, wherein a document illuminator comprising a small size light source, such as a light emitting diode (LED), in a light-transmissive element as shown in FIGS. 1a-2b is disclosed. As shown in FIG. 1a, the light-transmissive element 105, which performs the function of a light guide, comprises a part of the document illuminator 100 for scanning a document 10 on a platen 20. The light guide is configured to incorporate an LED 110 in a manner so as to provide a powerful and uniform illumination of the document in a compact size and form. FIGS. 2a and 2b show an enlarged view of the LED document illuminator. It will be noted from the cross-sectional view in FIG. 2a that the LED document illuminator 100 has substantially straight walls. As set forth in U.S. patent application Ser. No. 10/995,462, it has been found that the luminescence emanating from the document illuminator can be further strengthened and made more uniform by modifying the light guide to have nonlinearly shaped walls as schematically depicted in FIG. 1b.

FIG. 1a illustrates the placement of an LED document illuminator 100 in relation to a platen 10, and shows a document handler 20 configured to feed document 30 to be scanned by the document illuminator. Light guide 105 comprises a light source region 110, which emits light that is directed out of the light guide as rays 120 to illuminate the document 10 on platen 20, as shown in FIG. 1a. An imaging system 43, comprising a lens, causes an image of the portion of the document immediately surrounding optical centerline 40 to be projected onto a light sensing device 45 comprising a linear array of photo-sensors (for example, a full width array sensor), a charge coupled device (not shown), or a photoreceptor (not shown). The light reflected from the document about optical centerline 40 is converted by the light sensing device 45 into electronic signals forming image data which electronically represent the document, and the data may be stored on a recording device such as a memory storage device in a computer.

FIGS. 2a and 2b of U.S. patent application Ser. No. 10/995, 462 show a front view and a side view, respectively, of document illuminator 100 having substantially straight walls. The document illuminator is capable of illuminating page width documents ranging from, but not limited to, letter and legal size to A3, A4 sizes. An LED 130 is fitted inside a cavity 140 formed in the light-transmissive element or light guide 105. The cavity shown in FIGS. 2a and 2b is centrally located within the light-transmissive element. Light emanating from a light source 150 inside the LED is coupled into the light guide through the walls of the cavity. A chamfered aperture 160 is formed in the light guide to receive light either directly or reflectively, from the LED and redirect it to illuminate a document (not shown) adjacent the aperture. LED 130 may be held inside the cavity in a number of ways, including mounting the LED on a circuit board, which in turn forms a shoulder support 135 for the LED against the sidewall of the light guide 100, as shown in FIGS. 2a and 2b. The circuit board may be a component of an electronic system (not shown) for controlling the light source 150 of the LED 130. Cavity walls are polished to aid in the unimpeded transmission of light from the LED 130 to other parts of the light guide 100.

In general, light rays 151 (shown in solid arrows) emitted by the LED 130 will emanate radially in all directions from cavity 140, some refracting 153 and escaping into the surrounding environment, some others reflecting 155 (shown in dashed arrows) back into the guide, and bouncing back and forth before leaving the guide altogether. Ray 155 may go through, what is called, a retroreflection such that ray 155' is reflected parallel to the original ray 151. Some rays will travel directly into the region of the aperture 160 and project 167 onto the surrounding area, including the document to be illuminated. It will be noted that a ray, such as 151 striking the chamfered surface of aperture 160 will refract into the surrounding environment medium in the direction 167 shown in FIG. 2a.

The power and uniformity of light emanating from aperture 160 may be enhanced by guiding the light to reflect from the inside walls of the light-transmissive element 105 with reduced escaping into the surrounding environment before it is collected and then diffused out through the aperture for illuminating a document. In FIGS. 2a and 2b, the mostly internally reflected light rays are collected at an opaque diffuser 170. It is usually difficult to prevent all light rays from escaping into the environment. For example, light rays 151 traveling east and south-eastwardly in FIG. 2a have a loss component 153. To minimize such losses, it is possible to judiciously place opaque specular linings or light blockers 143 and 143' on certain portions of the cavity wall as shown in FIG. 2a. That is, as described in the related application of Ser. No. 10/995,462, most of the light rays that would have otherwise escaped are conserved and reflected back from specular blockers 143 and 143'. Consequently, most light rays, such as 151 traveling south-westward in view of FIG. 2b from LED 140, go through total internal reflection, that is, without any loss to the surrounding environment, as depicted by dashed rays 155, and arrive at diffuser 170 with more power than otherwise, and emanate from aperture 160 with a more uniform profile than otherwise.

As is known, total internal reflection of a ray of light at a boundary between two dissimilar media occurs at angles of incidence $\theta_i$ (measured from the normal to the boundary) greater than a critical angle $\theta_{cr}$ at which the ray can be refracted at a refraction angle $\theta_r=90°$ to the normal, that is, parallel to the boundary surface. For any light ray in the light-transmissive element 110 having an incident angle greater than $\theta_{cr}$, none of the light ray will escape from the light-transmissive element into the surrounding medium, thus yielding total reflection from the boundary back into the light guide, without any transmission of refracted light into the surrounding medium. This phenomenon which occurs at $\theta_{cr}$ is known as total internal reflection.

Disclosed herein is a light transmissive element, or light guide, having nonlinearly shaped walls associated with a light source so as to provide enhanced total internal reflection for light rays emanating from the light source as described below and shown in FIGS. 3a and 3b.

SUMMARY

Aspects disclosed herein include an apparatus comprising a light-transmissive element; the light-transmissive element having nonlinear walls; a cavity formed in the light-transmissive element; a light-emitting diode (LED) positioned inside the cavity; an aperture formed in the light-transmissive element positioned to receive light emitted from the LED; wherein the light traverses the aperture to illuminate a document; and an apparatus comprising a compound curved concentrator light-transmissive element having an aperture, and embedded LED, an optical source wherein light emitted from the LED is internally reflected from the optical source and from the walls of the CPC to said aperture, to illuminate a document; a lens configured to receive a reflected image of the document and to focus the reflected image on to an array of sensors to convert the images to electronic signals; and a memory storage device to record the electronic signals as digital data.

BRIEF DESCRIPTION OF DRAWINGS

FIGS. 2a and 2b are side and front view drawings, respectively, showing a straight-walled light-transmissive element fitted with an LED in a cavity formed therein.

DETAILED DESCRIPTION.

In embodiments there is illustrated:

a light-transmissive element having curved walls to serve as a light guide with an embedded light source. In one embodiment, the curve is parabolic in shape.

Figure 1A:
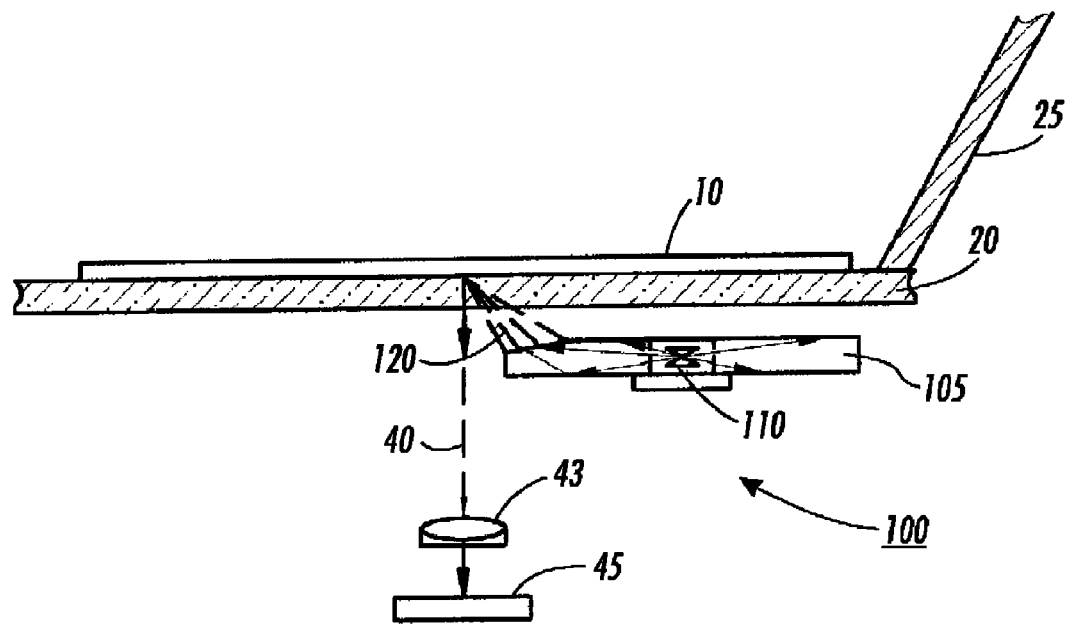
FIG. 1a is a drawing of a document illumination system showing the replacement of the lamp and reflector of a commonly used system with a straight-walled light-transmissive element fitted with a side emitting LED therein.
Figure 1B:
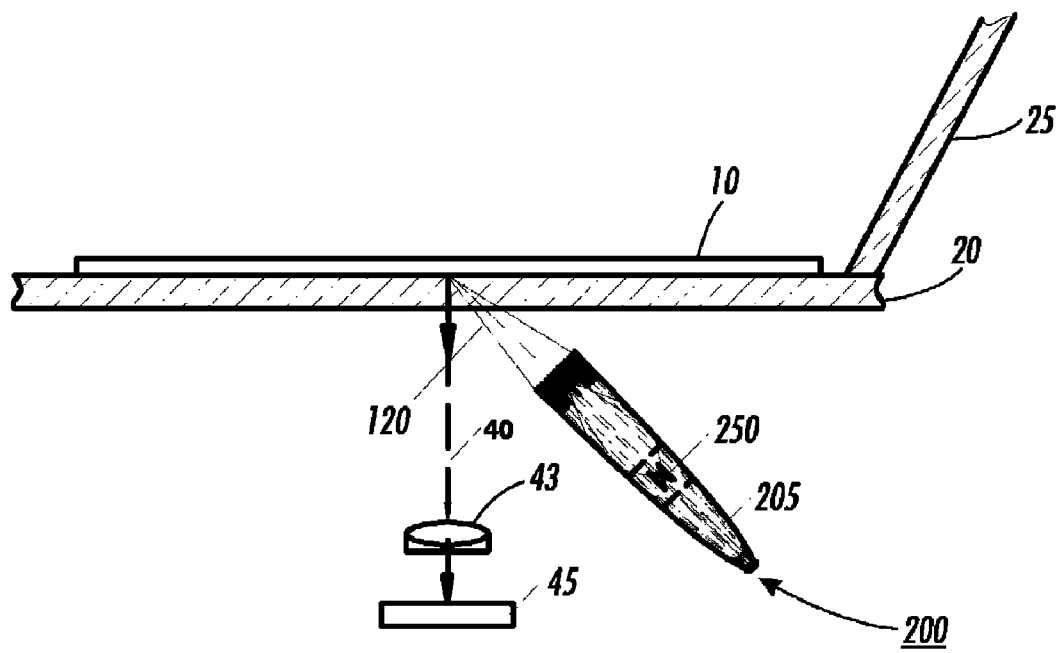
FIG. 1b is a drawing showing the replacement of the straight-walled light-transmissive element of FIG. 1a with an embodiment of an light-transmissive element having nonlinear curved walls.

FIG. 1b shows the replacement of the straight-walled light-transmissive element of FIG. 1a with an embodiment of a document illuminator 200 having an light-transmissive element with nonlinear walls 205 in the shape of a compound curved concentrator.

Figures 3A, 3B:
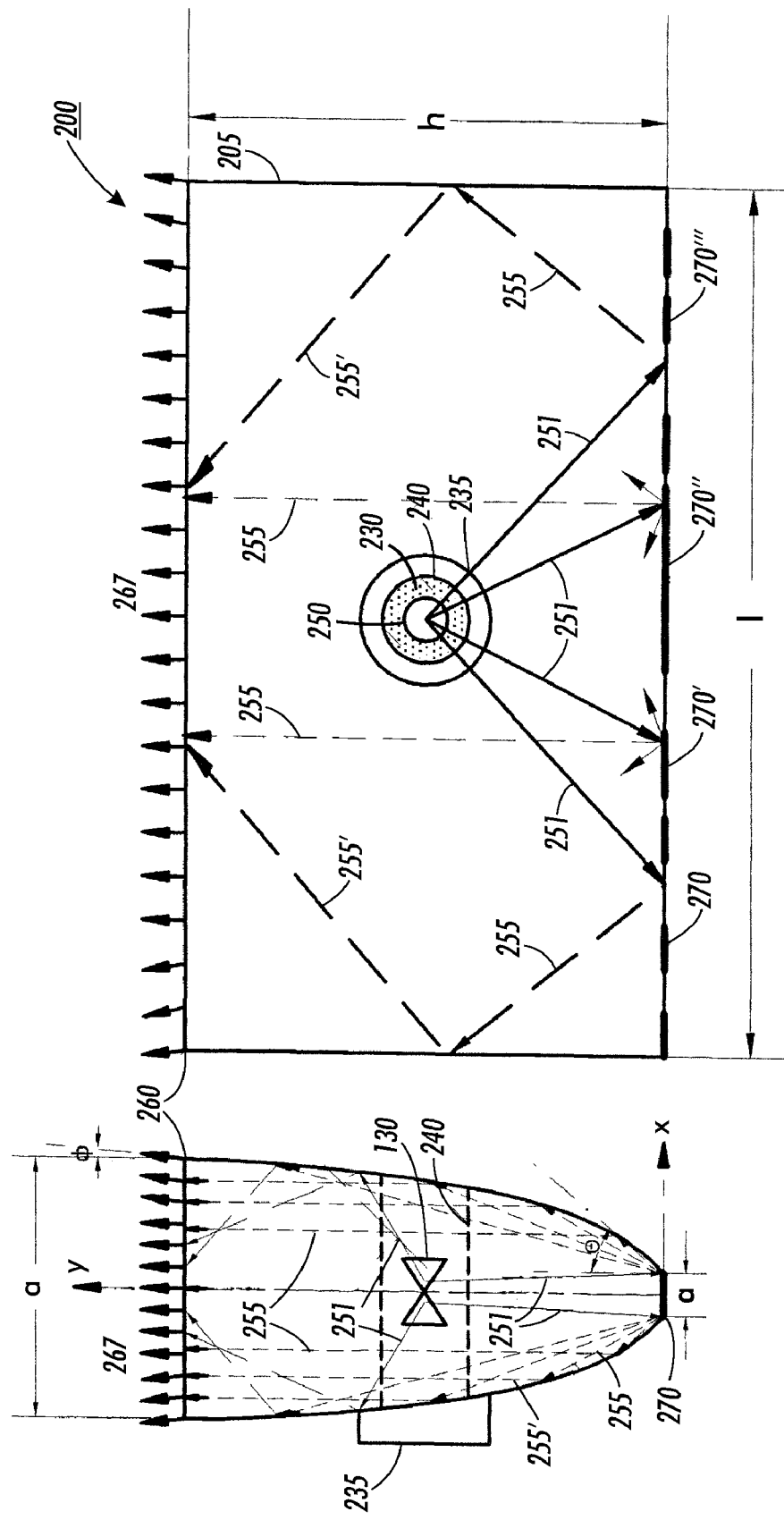
FIGS. 3a and 3b are side and front view drawings, respectively, of an embodiment showing the optically inverted function of the disclosed compound curved concentrator based light-transmissive element where light received from an embedded LED at a diffusive optical source is redirected to an aperture along with other light rays that go through total internal reflection from the nonlinear walls of the light-transmissive element.

FIG. 3a shows an enlarged side view of light-transmissive element 200 that serves as a light guide, or an optical connector, in guiding, or connecting, the light rays emanating from light source 250 to a document to be scanned on a platen (not shown). The light source comprises a side emitting LED 230 fitted inside a cavity 240 formed in the light guide 205. Light emanating from the light source is coupled into the light guide through the walls of the cavity. An aperture 260 is formed in the light guide to receive light either directly or reflectively, as explained further below, from the LED and redirect it to illuminate a document (not shown) adjacent the aperture. The light-transmissive element disclosed in FIGS. 3a and 3b has, unlike that of FIGS. 2a and 2b, nonlinear walls in the shape of a compound curve, for example a compound parabola, for the purpose of guiding and connecting the light source to the document in the most efficient manner. It is understood that the nonlinear walls may comprise other nonlinear shapes depending upon a particular application.

It is known that an optical connector with a hollow body formed with an input aperture and an output aperture and a wall connecting the two apertures and diverging from the smaller of the cross sectional areas to the larger cross sectional areas of the apertures can be used as a light collimator, like a spotlight. When the wall is comprised of a transparent dielectric material and is of a compound parabolic shape, the reflection on the wall from the inlet aperture to the outlet aperture follows a single total internal reflection path avoiding the losses of purely reflective reflectors. This light guiding optical connector is known as Compound Parabolic Concentrator (CPC). (See, for example, R. Wilson, "Dielectric Compound Parabolic Concentrators," Applied Optics," Vol. 15 (2), February 1976, pp. 291-292). Thus, typically a CPC concentrates light from a large area of small angular divergence to a smaller area of high angular divergence, following the well-known law of Etendue conservation.

In an embodiment shown in FIG. 3a, the light-transmissive element of the present disclosure comprises a compound curved concentrator having nonlinear walls that terminate at a top portion 260 and at a bottom portion 270. In the configuration shown in FIGS. 3a and 3b, the disclosed compound curved concentrator is optically inverted in that a small "spotlight" formed at the bottom portion is converted to "floodlight" emanating from the top portion. That is, light from a small optical source 270 of high angular divergence Θ (such as a Lambertian emitter having a luminous distribution that is uniform in all directions) is guided to an aperture 260 of a large area of small angular divergence φ of light rays. In an aspect, light rays 267 emanating from aperture 260 are nearly collimated in comparison with the light rays of 167 emanating from aperture 160 of the light-transmissive element of straight walls in FIG. 2a. Furthermore, since the output light at the aperture comprises light rays that have gone through total internal reflection at the walls of the compound curved concentrator, they retain the unattenuated power and uniformity of the light source to illuminate the document to be scanned.

The compound curved concentrator based document illuminator 200 comprises a clear acrylic material having a refractive index $\eta_{LTE}$ from about 1.4 to about 1.7, although other similar materials may also be used. Cavity 240 is located centrally within the light guide, however, it will be understood that other non-central positions in the light guide may also be used. The cavity may be a through-hole that goes through the width of the light guide shown in FIG. 3a, or a blind-hole that does not span the whole width, depending upon the manner in which it is desired to guide the light into and out of the illuminator. LED 230 may be held inside the cavity in a number of ways, including mounting the LED on a circuit board, which in turn forms a shoulder support 235 for the LED against the sidewall of the light guide 205, as shown in FIGS. 3a and 3b. The circuit board may be a component of an electronic system (not shown) for controlling the light source 250 of the LED 230. Cavity walls are polished to aid in the unimpeded transmission of light from the LED 230 to other parts of the light guide 205. The light-transmissive element 205 has height, h, from about 10 mm to about 40 mm, bottom width w from about 0.5 mm to 3 mm, an aperture width a from about 5 to about 10 mm, and a length, l, from about 100 to about 400 mm, but it can be longer for a different size.

In general, light rays 251 (shown in solid arrows) emitted by the LED 230 emanate radially in all directions from cavity 240 and are reflected from the walls of the guiding light-transmissive element. In one aspect of the embodiment shown in FIGS. 3a and 3b, the nature of reflections are governed by the characteristic optical properties of the disclosed compound curved concentrator based light-transmissive element is derived from the shape of the wall, which is made specularly reflecting.

In one aspect, the interface between the compound curved concentrator shaped light-transmissive element and its surround becomes a perfect total internal reflection mirror that permits no leakage of light radiation to the surroundings. In another aspect, some of the total internal reflection rays are directed towards the vertex of the compound curved concentrator where a judiciously placed diffuser 270 redirects the rays towards aperture 260 directly or indirectly through an additional reflection from the inside walls of the compound curved concentrator guide, 205. Consequently, light rays arriving at aperture are converted from a generally high angular divergence at 270 to a nearly collimated bundle 267 with low angular divergence at aperture 260. The luminescence now projected from aperture 260 to an adjacent platen (not shown) provides a highly powerful and uniform luminescence conditions for scanning a document. Aperture 260 may be perpendicular to the y-axis of the parabola, as shown in FIG. 3a, or at any slant angle, such as depicted in FIG. 1b.

It will be noted in FIGS. 3a and 3b that diffuser 270 may be placed at different locations in different lengths along the base of the compound curved concentrator based light-transmissive element in order to redirect the light rays to aperture 260 with minimum number of reflections from the walls of the curved light guide. For example, light rays 251 leaving cavity 240 towards the vertex or base of the light-transmissive element are redirected 255 towards aperture 260. It is also possible to direct the light emanating from a side emitting LED 230 directly towards discrete diffusers 270 by placing specular light blockers of different shapes on the walls of cavity 240 as is described in the related application Ser. No. 10/995,462.

The intensity and shape of the illumination emerging from aperture 260 is governed by how well the light emitted from the LED is directed to the aperture. As shown above, light emanating from a light source in a cavity such as shown in FIGS. 3a and 3b will project in all directions. In the embodiment shown in FIGS. 3a and 3b, the light is encouraged to reflect from the curved walls, as shown parabolic walls, of the light guide internally without losses to the surroundings and at the same time those that are focused towards the base of the curved light guide are diffusively redirected towards the aperture with minimal losses. The diffused reflector 270 has a reflectivity of approximately 90% so that the light that is redirected to the aperture 260 is transmitted to the scanned document at a relatively high strength and uniform illumination profile in the directions shown by arrows 267.

In one embodiment, the curved optical light source 270 shown in FIG. 3a, may be patterned with a series of white patches (270, 270', 270''') that frustrate total internal reflection and cause the internally reflected light to scatter and subsequently exit the light guide through aperture 260 with minimal power loss and maximal uniform illumination as shown in FIG. 3b. The patches may be discontinuous and of different shapes including, but not limited to square, rectangle, triangle, polygon and stretched versions of the same and other shapes. In one aspect, the size and position of the patches can be varied to custom tailor the shape of the illumination at the aperture. In another aspect, by making the white diffuse patches graduated, that is, smaller near the light source and progressively larger in length further away, the variability of the illumination profile from one end to another can be minimized resulting in a uniform profile with sufficient output power level along the whole length of the aperture. The aperture itself may be molded in various configurations and at different slant angles, for example, with respect to the y-axis of a parabolic configuration, to shape the illumination profile and enhance exposure efficiency.

It will be appreciated that variations of the above-disclosed embodiments and other features and functions, or alternatives thereof, may be desirably combined into many other different devices or applications. Also that various presently unforeseen or unanticipated alternatives, modifications, variations or improvements therein may be subsequently made by those skilled in the art which are also intended to be encompassed by the following claims.

The invention claimed is:

1. An apparatus comprising:
    a compound curved concentrator based light-transmissive element having a dielectric material and a non-linear surface;
    a cavity formed within said light-transmissive element configured to retain a light source;
    an aperture formed in the light-transmissive element positioned to receive light emitted from a light source retained in the cavity; and
    a diffuser element positioned at a base of the compound curved concentrator based light-transmissive element to redirect light impinging thereupon,
    wherein the non-linear surface of the light-transmissive element is configured to reflect light from the diffuser element and/or the light source essentially entirely internally such that light emanating from the aperture is substantially collimated.

2. The apparatus in accordance with claim 1, wherein the non-linear surface of the light-transmissive element comprises a parabolic element, and the diffuser element is positioned at a base of the parabolic element.

3. The apparatus in accordance with claim 1, wherein the non-linear surface of the light-transmissive element terminates at a bottom portion and a top portion.

4. The apparatus in accordance with claim 3, wherein said bottom portion forms an input optical source.

5. The apparatus in accordance with claim 3, wherein the top portion forms an output aperture.

6. The apparatus in accordance with claim 1, wherein the light-transmissive element has a refractive index from about 1.4 to about 1.7.

7. The apparatus in accordance with claim 1, wherein the cavity has a circular cross-section.

8. The apparatus in accordance with claim 1, wherein the light-transmissive element provides total internal reflection of light rays.

9. The apparatus in accordance with claim 1, wherein the aperture is positioned at a slant with respect to the longitudinal axis of the light-transmissive element.

10. The apparatus in accordance with claim 1, wherein the nonlinear surface of the light-transmissive element envelopes a portion of the light-transmissive element.

11. The apparatus in accordance with claim 1, wherein said light-transmissive element has a length from about 100 mm to about 400 mm.

12. The apparatus in accordance with claim 1, wherein said light-transmissive element has a height from about 10 mm to about 40 mm.

13. The apparatus in accordance with claim 1, wherein at least one specular light blocker is provided on a wall of the cavity so as to direct light emanating from the light source directly towards the base.

14. The apparatus in accordance with claim 1, wherein the diffuser element has a reflectivity of about 90%.

15. The apparatus in accordance with claim 1, wherein the diffuser element is a white diffuse patch.

16. The apparatus in accordance with claim 1, further comprising the light source, wherein the light source is retained in the cavity.

17. The apparatus in accordance with claim 16, wherein the light source comprises a side-emitting light emitting diode (LED).

18. An apparatus comprising:
a compound curved light-transmissive element having a non-linear surface;
a cavity formed within said light-transmissive element configured to retain a light source;
an aperture formed in the light-transmissive element positioned to receive light emitted from a light source retained in the cavity; and
a diffuser element positioned at a base of the compound curved light-transmissive element to redirect light impinging thereupon,
wherein said light-transmissive element has a bottom width about 0.5 mm to about 3 mm, and an aperture width ranging from about 3 mm to about 10 mm.

19. An apparatus comprising:
a compound curved light-transmissive element having a non-linear surface;
a cavity formed within said light-transmissive element configured to retain a light source;
an aperture formed in the light-transmissive element positioned to receive light emitted from a light source retained in the cavity; and
a diffuser element positioned at a base of the compound curved light-transmissive element to redirect light impinging thereupon,
wherein the diffuser element comprises plural diffusers elements positioned at the base, each of which is progressively larger in length the further away from the light source.

* * * * *